Dec. 16, 1958 V. R. BATES 2,864,441
HEAD RAIL ASSEMBLY FOR VENETIAN BLINDS
Filed Oct. 11, 1954 2 Sheets-Sheet 1
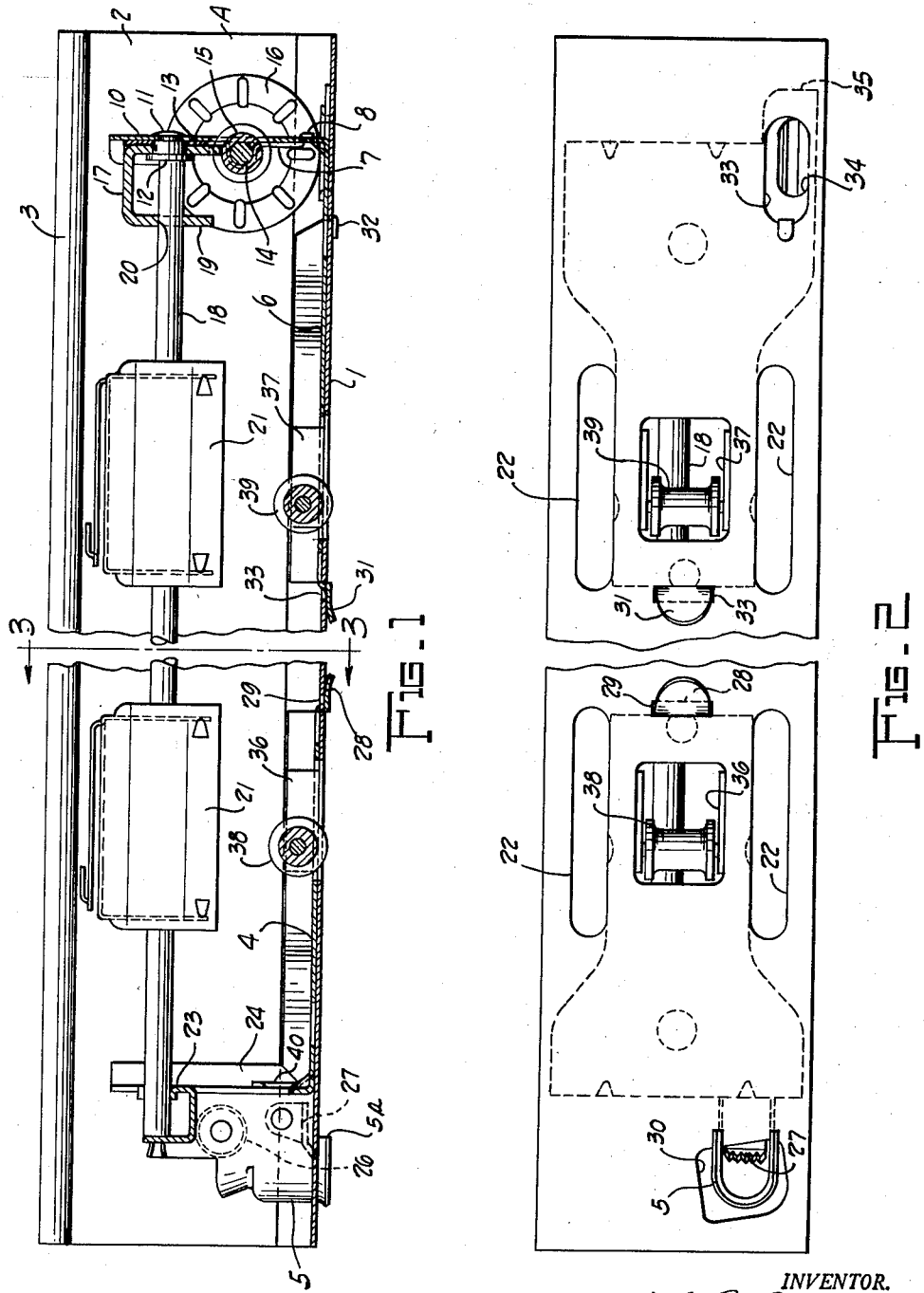

Dec. 16, 1958   V. R. BATES   2,864,441
HEAD RAIL ASSEMBLY FOR VENETIAN BLINDS
Filed Oct. 11, 1954   2 Sheets-Sheet 2

INVENTOR.
V. R. Bates
BY

United States Patent Office 2,864,441
Patented Dec. 16, 1958

2,864,441

HEAD RAIL ASSEMBLY FOR VENETIAN BLINDS

Verne R. Bates, Avon Lake, Ohio, assignor to Wright Sales Company, Inc., Cleveland, Ohio, a corporation of Ohio Application October 11, 1954, Serial No. 461,491

1 Claim. (Cl. 160—173)

My invention comprises improvements in Venetian blinds and particularly the type of construction of such blinds wherein the head rail is in the form of a U-channel which houses the tilt means for supporting the blind slats, the tilt unit bracket assembly, and the cord lock unit assembly.

The primary object of the invention is to provide specifically novel structures for the cord lock supporting bracket and a generally similar tilter supporting bracket, whereby said brackets are adapted, without the employment of tools, to be interlocked in place in the head rail channel by means of interlock parts on said brackets, which coact with the bottom only of the said rail channel. The interlock means aforesaid is further designed with a view to enabling quick engagement of the said supporting brackets with the base of the rail channel, and when necessary, equally quick detachment of the said brackets and cord lock and tilter parts carried thereby, for purposes of repair of said units as respects replacement, for instance, of the pulley and worm elements thereof, or for any other purpose rendering such removal or detachment desirable.

Another object had in mind respecting the mentioned interlock features has been to make the same as simple as possible to keep down the amount of material required and maintain the cost factors as low as possible consistent with obtaining a highly effective construction in use.

Other features of my invention along with the advantages thereof will be apparent on reference to the following description, and to the accompanying drawings, and in the latter:

Figure 1 is a vertical longitudinal sectional view taken through a head rail channel such as employed in conjunction with my invention and illustrating the cord lock unit and the tilter unit supporting brackets connected with the base of the channel by the interlock means of the invention; also illustrating the blind slat tilting shaft and devices thereon for connecting the blind tapes with said shaft.

Figure 2 is a bottom plan view of the parts as generally shown in Figure 1.

Describing the present invention specifically and referring particularly to the drawings, the head rail assembly illustrated comprises primarily the main U-shaped channel A which may be generally of conventional form and includes the bottom 1 and vertical side flanges 2 extending upwardly from said bottom, the flanges being rolled inwardly at their upper edges as shown at 3.

Figure 3:
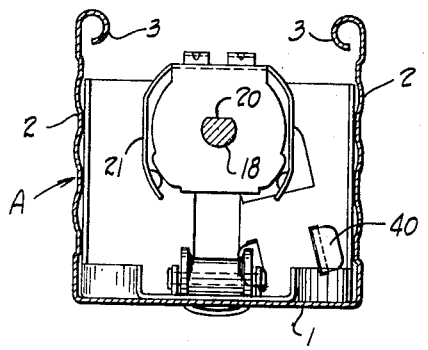
Figure 3 is a vertical sectional view taken about on the line 3—3 of Figure 1 looking in the direction of the arrows.

Within the channel 1, and resting on the bottom thereof, are the supporting brackets 4 for the cord lock unit 5, and 6 for the tilter unit which comprises a vertical plate 7 having lugs 8 at its lower edge to enter approximately horizontal slots 9 of an extension 10 projecting vertically from the outer end of the plate 6. The lugs 8 interlock the lower end portion of the plate 7 to said vertical extension 10 of the plate 6 and the upper portion of the plate 7 is connected to the upper portion of the extension 10 by means of a rivet 11 having a head 12 on its inner end and passing through the member 10, the plate 7 and the worm sector 13, so that the head of the rivet, designated 12, lies on the inner side of the sector 13 and holds the latter for rotative movement upon the extension member 10. The sector 13 is provided with the usual teeth for engaging a worm 14 fixed to the shaft 15 which carries the cord pulley 16 of the tilting unit. The sector 13 is really one side of a yoke member or U-shaped plate 17, the other side of said plate having an opening or bearing therein for the tilting shaft 18. The bearing opening in the other side of the plate 17 which side is designated 19 has a flat portion 20, see Figure 3, and the cross sectional shape of the shaft 18 corresponds with the shape of the opening or bearing 20 so that the shaft 18 will be rotated when the sector plate 13 is rotated by means of the cord pulley 16. The parts 13 to 20 as above described are generally similar to the construction that is well known in the art for enabling a rotative movement to be imparted to the tilt shaft 18 by means of what is ordinarily termed the tilting unit of the assembly.

On the tilting shaft 18 are mounted the tape attaching drum-like members 21 having suitable means for clamping tape thereto not forming a part of the present invention, and the tapes clamped to and suspended from the drum elements 21 pass downwardly through suitable slots 22 formed in the bottom 1 of the channel A. The end of the shaft 18 opposite that which is supported by the sector plate 17 is supported upon a suitable bearing member 23 on the vertical end extension 24 which is carried by the outer end of the cord lock supporting bracket 4 which comprises a base plate similar to that of the tilt unit supporting bracket 6. A bendable lug 25 near the upper edge of the extension 24 of the supporting bracket 4 may be bent over the adjacent end of the shaft 18 for preventing accidental displacement of said shaft from its mounting bearing 23 on the said extension 24.

The cord lock unit 5 comprises a simple housing such as usually employed and between the sides of which is mounted the usual cord pulley 26 and the cord engaging or locking dog 27, the operation of which parts is well known and conventional in the art.

The detail construction of the cord lock supporting brackets and the tilter unit supporting bracket will now be described in reference to those features thereof which constitute the present invention primarily and which relate to the quick snap-on or interlocking instrumentalities whereby the said brackets are assembled into positions within the rail A so as to be firmly held in a stationary manner on the bottom of said rail, the interlock connection or means employed however permitting of quick removal of the cord lock supporting bracket and the tilter unit supporting bracket with their parts assembled thereon, whenever necessary and for purposes previously indicated herein.

First referring to the supporting bracket 4 and having in mind that this bracket comprises primarily the base portion which lies flat upon the bottom of the rail A, and the extension 24 which projects vertically upward from the outer end of said base portion, it is notable that on the inner end of the base portion there is provided a downwardly deflected interlock lug 28 which curves downwardly immediately from the adjacent end of the member 4 and then extends outwardly substantially parallel to said member and then is bent down further at the extremity of the lug. This lug 28 is adapted to pass through a narrow slot 29 in the bottom 1 of the rail A and to engage resiliently with the underside of said bottom 1 as seen best in Figure 1. The lug 28 provides an inner end interlock means for the bracket base of the supporting bracket 4 and to obtain an outer end interlock the housing of the cord lock unit 5, which is somewhat U-shaped in vertical cross section as seen in Figure 2 is formed at the lower end thereof and in the side portions with interlock notches 5a, the vertical width of which corresponds approximately with the thickness of the material of the bottom 1 of the rail A. The notches 5a are slightly elongated in the direction of the axis of the channel or rail A and the lower end of the housing 5 is adapted to enter and pass through in a downward manner an opening 30 in the channel or rail A near one end thereof, the left end as illustrated in Figure 1. The operation of interlocking the cord lock bracket or supporting member with the channel or rail A is comparatively simple. All that is necessary is to place the supporting bracket 4 downwardly upon the bottom of the channel A near the left end portion as seen in Figure 1, cause the lug 28 to enter its slot provided in said bottom 1 by a sort of downward angular and rightward pressure on the supporting bracket 4 as by grasping the extension 24 thereof. Before shoving the bracket 4 fully in a rightward direction to interlock the lug 28 in its slot aforesaid, designated 29, the outer end of the bracket 4 will be forced downwardly so that the housing 5 at its lower extremity is caused to pass through the opening 30 whereby when a final movement in a rightward direction is imparted to the bracket 4 the notched portions 5a at the bottom of said housing 5 will be engaged with the bottom of the rail or channel A with the interlocking cooperation illustrated in Figure 1. Thus the cord lock unit 5 is utilized for the bracket 4 as the interlocking means coacting with the channel A at one end of said bracket. The lug 28 moreover has resilient and frictional binding effect vertically against the bottom of the channel and this resilient or spring engaging effect has a tendency to lift the cord lock end of the bracket 4. On this account when the bracket 4 is interlocked in the manner shown in Figure 1, the tendency of the left end of the bracket to rise or move upwardly incident to the coaction of the lug 28 with the under side of the channel creates a binding or friction engaging effect of the lower end of the housing 5 at its notched portions 5a so that the housing below said notched portions by such binding effect prevents unauthorized movement of the supporting bracket 4 once it has been placed in position.

Figure 4:
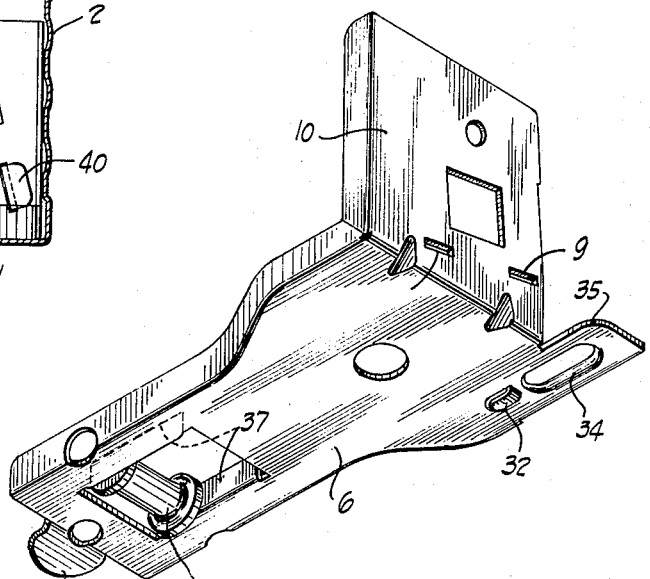
Figure 4 is a perspective view of the supporting bracket for the tilting unit looking toward the bracket from the underside thereof and toward the end of the bracket carrying the supporting extension on which the tilting unit is mounted.
Figure 5:
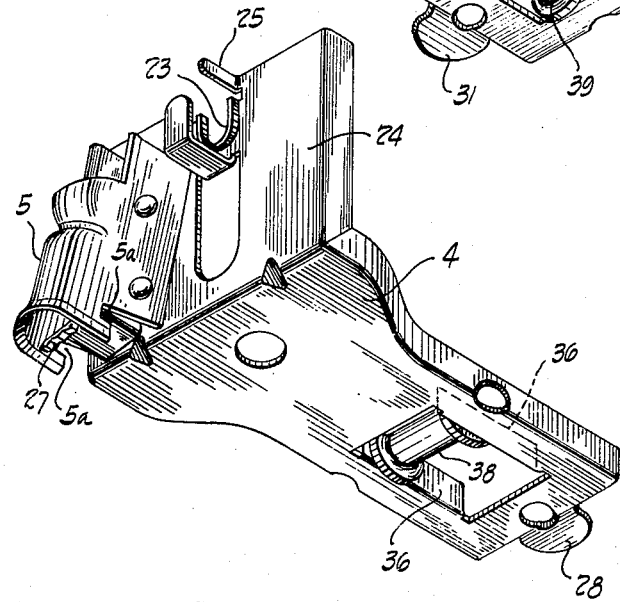
Figure 5 is a view somewhat similar to Figure 4 but illustrating the cord lock supporting bracket and bringing out the manner in which the cord lock unit is carried on said bracket at the end extension of the latter.

Passing now to the means employed for interlocking the tilter unit supporting bracket 6 with the bottom portion of the channel A, it is notable upon reference particularly to Figure 4 that there is employed at the inner end of the base of the bracket 6 the lug 31 which functions similarly to the lug 28 of the supporting bracket 4. To provide interlocking means between the outer portions of the bracket 6 and the bottom 1 of the channel A, the base portion of the bracket 6 has a lug 32 of somewhat L form in side elevation punched downwardly from the under side of said base portion out of the body thereof, the lower portion of the lug 32 being parallel with the plane of the base of the bracket 6. The lug 32 acts in a manner very similar to the lugs on the bottom edge of the housing of the cord lock unit 5 which are formed by the provision of the notches or slots 5a in the latter. With the foregoing construction of the bracket 6 in mind, therefore, it is obvious upon reference to Figure 1 that the inner end lug 31 of the bracket 6 may be introduced through a slot 33 in the bottom 1 of the rail, similar to the slot 29 and then the outer portion of the bracket 6 may be rocked downwardly against the spring friction action of the lug 31 bearing against the under side of the bottom 1, until the lug 32 passes through a cord slot 33 in said bottom 1. After the bracket 5 has thus been caused to assume a position in contact with the upper side of the bottom 1 of the channel the bracket may be caused to slide toward the middle of the channel longitudinally in the space between the flanges 2 and in this manner the lug 31 of the bracket 6 along with its lug 32 will be finally fully engaged with the under side of the channel and yieldingly held downwardly by the frictional engagement of the lug 32 with said bottom 1, against unauthorized displacement.

The slot 33 of the bottom 1 coincides with the slotted portion 34 of a guide member 35 constituting an extension of the outer end of the base of the bracket 5. The guide member 35 guides the ends of the cord which pass downwardly from the operating pulley 16 of the tilting unit, as they extend downwardly to a suitable point adjacent to the blind supported by the head assembly, said ends of the cord having suitable knobs or handles attached thereto in the customary way.

The base portion of the bracket 4 has at the end adjacent its lug 28 upwardly struck flanges 36 for supporting the pintle on which a suitable pulley may be mounted and the bracket 6 is similarly formed with flanges 37 for the same purpose. The pulleys of the respective brackets 4 and 5 are designated 38 and 39 respectively in Figure 2.

It is apparent that the snap on or interlock means for uniting the rail A with the cord lock and tilter unit supporting brackets are very simple and effective means to accomplish the purposes thereof as above set forth.

The cord lock housing 5 is secured to the extension 24 of the bracket 4 by lugs 40 passing through the member 24 from the outer side, and bent against the inner side, of the said member.

I claim:

The improvement in Venetian blinds which comprises the combination with a head rail consisting of a generally U-shaped channel for enclosing mechanism for operating a blind, of a supporting bracket including a base portion to rest in contact with the upper side of the bottom of said channel, the bottom of the channel having spaced slots therein, and spaced lugs carried by said bracket and projecting downwardly therefrom through said slots and movable by longitudinal movement of the bracket to underlie and frictionally engage the under side of the channel for holding the bracket stationary on the channel, wherein one of the lugs of the bracket projects from an end of said base and resiliently engages the bottom of the channel on the under side of the latter, a cord lock unit is carried on the bracket, and the other lug of the bracket is directly formed on the cord lock unit.

References Cited in the file of this patent

UNITED STATES PATENTS

| | | |
|---|---|---|
| 1,253,764 | Zahner | Jan. 15, 1918 |
| 2,580,252 | Stuber et al. | Dec. 25, 1951 |
| 2,620,866 | Rosenbaum | Dec. 9, 1952 |